(12) United States Patent
Matsuoka

(10) Patent No.: US 6,288,734 B1
(45) Date of Patent: Sep. 11, 2001

(54) SCANNING OPTICAL DEVICE AND IMAGE FORMING APPARATUS USING THE SAME

(75) Inventor: Kazuhiko Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/603,186

(22) Filed: Jun. 26, 2000

(30) Foreign Application Priority Data

Jun. 29, 1999 (JP) .................................................. 11-183727

(51) Int. Cl.$^7$ .............................. B41J 2/385; G03G 13/04
(52) U.S. Cl. ........................... 347/134; 347/241; 347/256
(58) Field of Search .................................. 347/129, 134, 347/137, 241, 243, 244, 256, 258, 259, 260, 261

(56) References Cited

U.S. PATENT DOCUMENTS

| | | | |
|---|---|---|---|
| 4,630,070 | * 12/1986 | Sato | 347/256 |
| 5,539,441 | * 7/1996 | Appel et al. | 347/134 |
| 5,706,119 | * 1/1998 | Anzai | 347/259 X |
| 5,764,274 | * 6/1998 | Sousa et al. | 347/258 |
| 5,841,463 | * 11/1998 | Debesis et al. | 347/244 X |
| 6,104,523 | * 8/2000 | Ang | 347/243 X |

* cited by examiner

Primary Examiner—Sandra Brase
(74) Attorney, Agent, or Firm—Fitzpatrick, Cella, Harper & Scinto

(57) ABSTRACT

A scanning optical device to be used for an image forming apparatus such as a laser beam printer and a digital copying machine comprises a light source such as a semiconductor laser, an optical deflector such as a rotary polygon mirror, a first optical system for leading the light beam emitted from the light source to the optical deflector, and a second optical system for focussing the light beam deflected by the optical deflector onto a surface to be scanned. The first optical system is adapted to make the light beam strike a deflection surface of the optical deflector with a width greater than that of the deflection surface in the main-scanning direction. The second optical system has an optical element provided on at least an optical surface thereof with an anti-reflection film having a film thickness so adapted as to maximize its light transmittance for the angle of incidence of the most off-axis ray of the light beam deflected by the optical deflector and striking the optical surface.

13 Claims, 5 Drawing Sheets

SCANNING OPTICAL DEVICE AND IMAGE FORMING APPARATUS USING THE SAME

BACKGROUND OF THE INVENTION

1. Field of the Invention

This invention relates to a scanning optical device and an image forming apparatus realized by using such a device. A scanning optical device according to the invention can suitably be used for an image forming apparatus such as a laser beam printer (LBP) or a digital copying machine.

2. Related Background Art

Scanning optical devices to be used for imageforming apparatus including laser beam printers and digital copying machines are adapted to cyclically deflect a light beam such as a laser beam that is optically modulated according to an image signal and emitted from a light source by means of an optical deflector such as a rotary polygon mirror, converge the deflected light beam to a spot of light on a surface of a photosensitive recording medium (photosensitive drum) by means of an imaging optical system having a so-called fθ feature and cause the light beam to scan the surface in order to record an image.

The optical requirements to be met by such a scanning optical system include that it can excellently focus the light beam on the photosensitive drum and it shows an fθ feature in the main-scanning direction. Japanese Patent Application Laid-Open No. 9-230274 proposes a scanning optical system satisfying those requirements. FIG. 1 of the accompanying drawings is a schematic perspective view of a principal portion of such a known typical optical scanner as applied to an image forming apparatus such as a laser beam printer or a digital copying machine.

Referring to FIG. 1, the light beam emitted from a semiconductor laser 21 is substantially collimated by a collimator lens 22 and then transformed into a divergent light beam by a spherical lens 46 having negative power. Then, the divergent light beam is made to enter a cylindrical lens 24 by way of a first fold mirror 18 to be converged in the sub-scanning section, i.e. a plane intersecting the optical axis along the sub-scanning direction. The converged light beam is reflected by a second fold mirror 25 and transmitted through an fθ lens system 27 having a spherical lens 27a and a toric lens 27b before it strikes the deflection surface (reflection surface) 26A of an optical deflector 26 and becomes focussed to form a substantially linear image (extending in the main-scanning direction) near the deflection surface. Note that the light beam striking the deflection surface 26A is made to show a predetermined angle relative to a plane (in which the optical deflector rotates and which is) perpendicular to the axis of rotation of the optical deflector in the sub-scanning section containing the axis of rotation of the optical deflector 26 and the optical axis of the fθ lens system 27.

On the other hand, the light beam entering the cylindrical lens 24 is not modified in the main-scanning section, i.e. a plane intersecting the optical axis along the main-scanning direction, and is then reflected by the second fold mirror 25 and transmitted through the fθ lens system 27 before it strikes the deflection surface 26A of the optical deflector 26 substantially along the center line of the deflection angle of the optical deflector 26 (front incidence). At this time, the divergent light beam is made to show a sufficiently large width relative to the facet width of the deflection surface 26A of the optical deflector 26 in the main-scanning direction by the collimator lens 22 and the spherical lens 46. Such an optical system is referred to as overfilled optical system.

The light beam deflected/reflected by the deflection surface 26A of the optical deflector 26 is led to the surface 31 of the photosensitive drum by way of the fθ lens system 27, a plane mirror 28 and a cylindrical mirror 34 having predetermined power only in the sub-scanning direction. Then, the light beam optically scans the surface 31 of the photosensitive drum in the direction of arrow B (main-scanning direction) as the optical deflector 26 is driven to rotate in the direction of arrow A. As a result of this scanning operation, an image is recorded on the surface 31 of the photosensitive drum operating as recording medium.

Referring to FIG. 1, an anti-dust glass panel 30 is arranged between the cylindrical mirror 34 and the surface 31 of the photosensitive drum to prevent fine particles of toner and paper floating in air near the surface 31 of the photosensitive drum from colliding with and adhering to the optical elements (on the rotary polygon mirror side).

A scanning optical device comprising an overfilled optical system and having a configuration as described above shows an excellent deflection efficiency due to its optical deflector and hence is adapted to high speed scanning operation. On the other hand, however, the quantity of light getting to a unit area of the surface to be scanned (surface of the photosensitive drum) varies between on axis and off axis in the main-scanning direction to make it impossible to realize a uniform distribution of quantity of light in the main-scanning direction. This is because the deflection surface having a width smaller than that of the light beam moves in the light beam with a changing deflection angle along the main-scanning direction. More specifically, the deflection surface is located at a position squarely facing the light beam when the latter is scanning an area on and near the optical axis, whereas it is located at a position inclined relative to the light beam when the latter is scanning an off-axis area. Thus, the ratio of the quantity of light striking the deflection surface to the total quantity of light emitted from the optical system for incident light of the device and hence the quantity of light getting to a unit area of the surface to be scanned vary as a function of the angle of the deflection surface.

Meanwhile, the intensity distribution of the light beam from a semiconductor laser is normally a Gaussian distribution, where the intensity of light is higher at the center than at the periphery of the light beam. Therefore, the quantity of light getting to a unit area of the surface to be scanned (surface of the photosensitive drum) is greater on axis than off axis in the main-scanning direction to produce an uneven distribution of quantity of light.

SUMMARY OF THE INVENTION

Therefore, it is the object of the present invention to provide a scanning optical device that is free from the above identified problems of the prior art and provides a substantially uniform distribution of quantity of light and an image forming apparatus comprising such a scanning optical device.

According to the invention, the above object is achieved by providing a scanning optical device comprising:

a light source;

an optical deflector having a deflection surface adapted to deflect the light beam emitted from the light source in the main-scanning direction;

a first optical system for leading the light beam emitted from the light source to the optical deflector, the first optical system being adapted to make the light beam strike the deflection surface of the optical deflector with a width greater than that of the deflection surface in the main-scanning direction; and a second optical system for focussing the light beam deflected by the optical deflector onto a surface to be scanned;

the second optical system having an optical element provided on at least an optical surface thereof with an anti-reflection film having a film thickness so adapted as to maximize its light transmittance for the angle of incidence of the most off-axis ray of the light beam deflected by the optical deflector and striking the optical surface.

In another aspect of the invention, there is provided an image forming apparatus comprising:

scanning optical device having the above constitution;

a photosensitive member arranged at the surface to be scanned;

a developing unit for developing an electrostatic latent image formed on a surface of the photosensitive member by the light beam made to scan the surface by means of the scanning optical device into a toner image;

a transfer unit for transferring the developed toner image onto a toner image receiving member; and a fixing unit for fixing the transferred toner image on the toner image receiving member.

DESCRIPTION OF THE PREFERRED EMBODIMENTS

[Embodiment 1]

Figure 1:
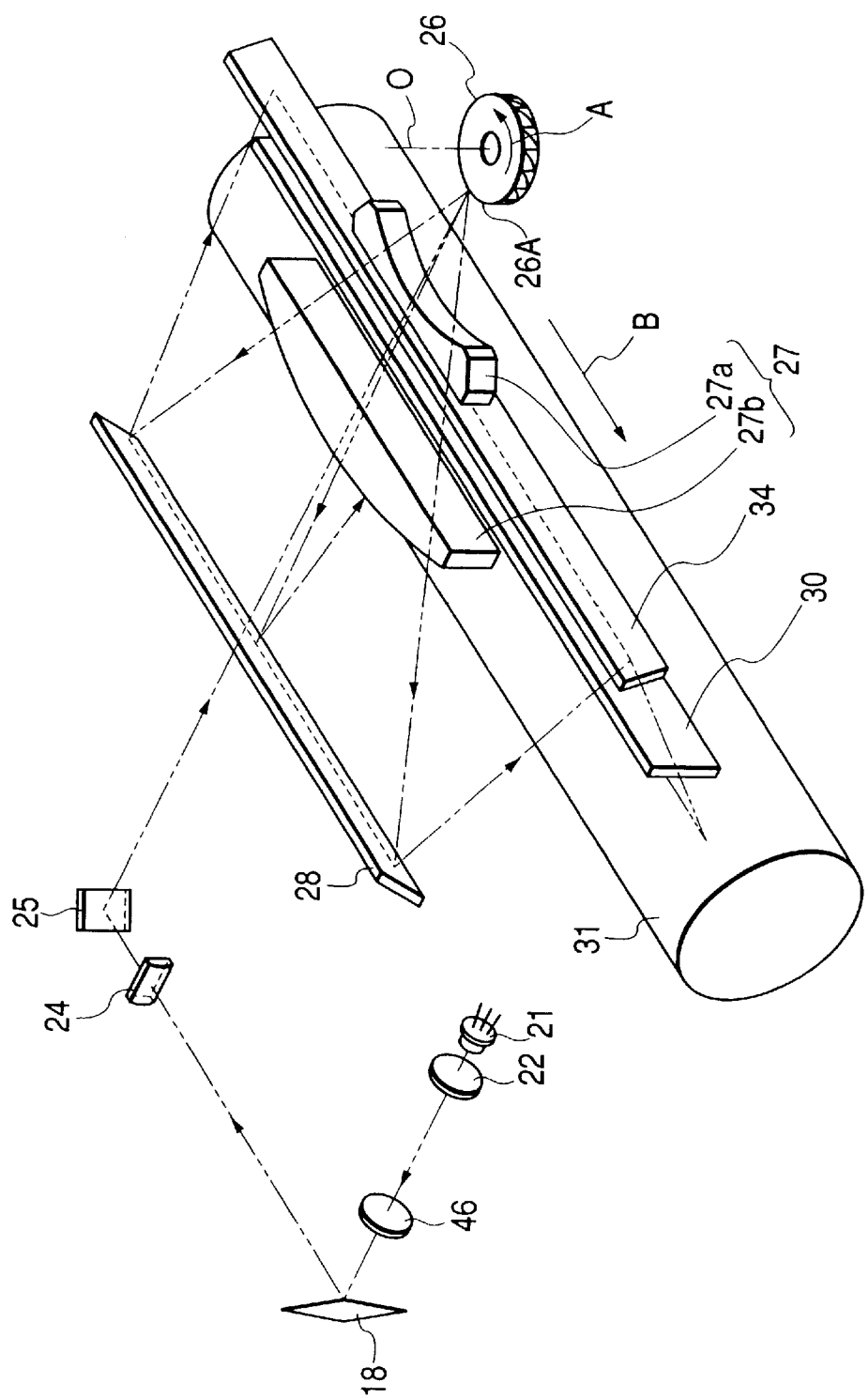
FIG. 1 is a schematic perspective view of a principal portion of a known scanning optical device used in an image forming apparatus.
Figure 2:
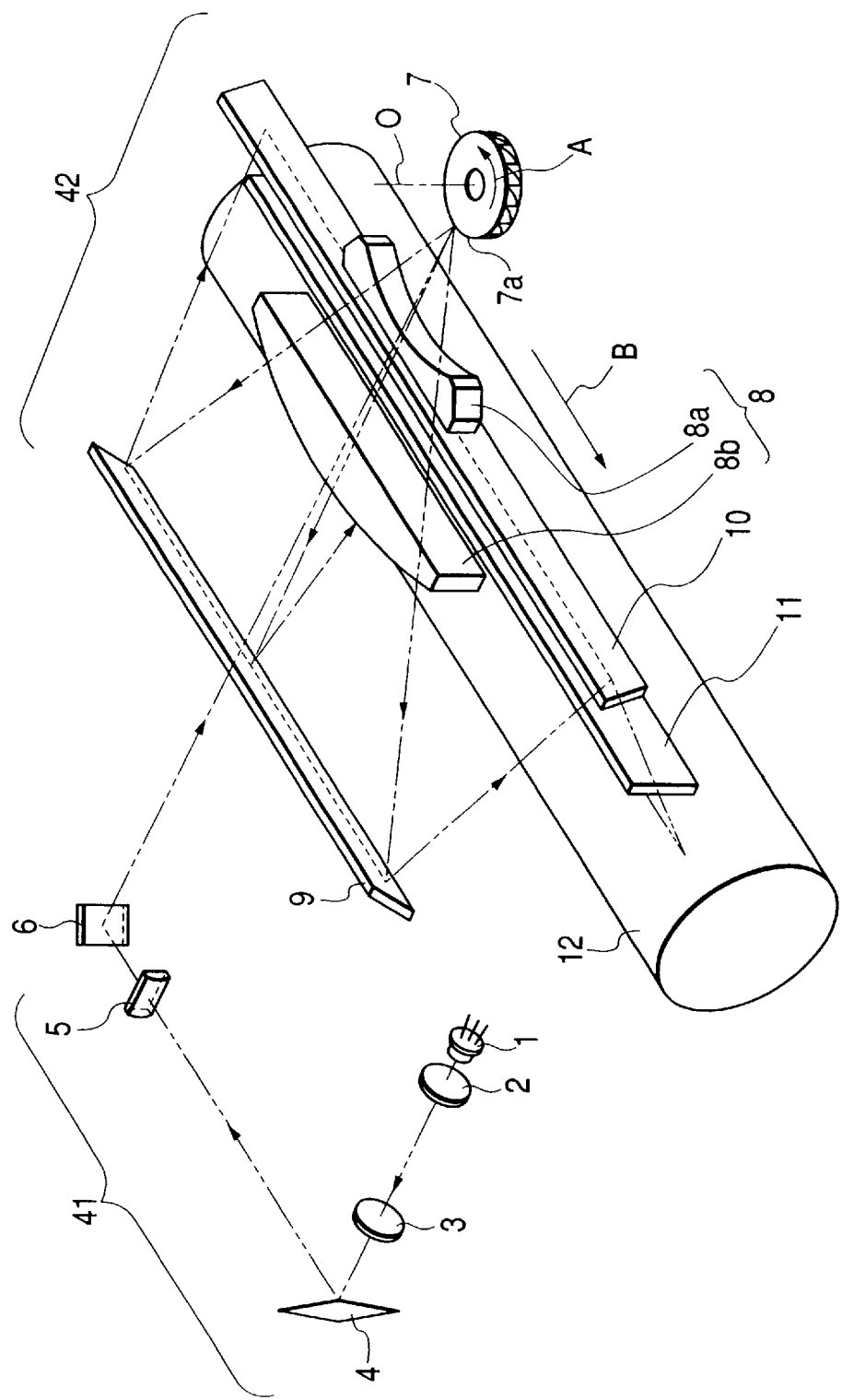
FIG. 2 is a schematic perspective view of a principal portion of Embodiment 1 of scanning optical device according to the invention and used in an image forming apparatus.

FIG. 2 is a schematic perspective view of a principal portion of Embodiment 1 of scanning optical device according to the invention and used in an image forming apparatus, which may be a laser printer or a digital copying machine.

In FIG. 2, there are shown a light source 1 that may typically be a semiconductor laser, a collimator lens 2 for substantially collimating the divergent light beam emitted from the light source 1, a spherical lens 3 having negative power and adapted to transform the substantially collimated light beam produced by the collimator lens 2 into a divergent light beam and a first fold mirror (plane mirror) 4 for reflecting the light beam that strikes it.

Reference symbol 5 in FIG. 2 denotes a cylindrical lens showing predetermined refractive power only in the sub-scanning direction and adapted to focus the light beam reflected by the first fold mirror 4 on the deflection surface (reflection surface) 7a of an optical deflector 7, which will be described in greater detail hereinafter, in the sub-scanning section, by way of a second fold mirror (plane mirror) 6 also for reflecting the light beam that strikes it.

Thus, the collimator lens 2, the spherical lens 3, the first fold mirror 4, the cylindrical lens 5 and the second fold mirror 6 form a first optical system, which is referred to as optical system for incident light 41.

Reference symbol 7 denotes a deflection element, or an optical deflector, typically comprising a polygon mirror adapted to be driven to rotate by a drive means such as a motor (not shown) at a constant rate in the sense of arrow A in FIG. 2.

Reference symbol 42 denotes a second optical system having a light converging effect and an fθ feature so that it is referred to as focussing optical system. The focussing optical system 42 has an fθ lens system 8 including a spherical lens 8a and a toric lens 8b, a third fold mirror (plane mirror) 9 also for reflecting the light beam that strikes it and a cylindrical mirror 10 also for reflecting the light beam that strikes it, said cylindrical mirror 10 showing predetermined refractive power only in the sub-scanning direction. The focussing optical system 42 focusses the light beam representing image information and deflected/reflected by the deflection surface 7a of the optical deflector 7 on the surface to be scanned, which is the surface 12 of a photosensitive drum, as a spot of light. The deflection surface 7a of the optical deflector 7 and the surface 12 of the photosensitive drum (surface to be scanned) are made to show an optically conjugate relationship by the focussing optical system 42 in the sub-scanning section. This arrangement is intended to correct the tilt effect of the deflection surface 7a due to the error involved in placing the optical deflector 7 in position relative to the optical axis and/or the machining error of the deflection surface 7a and hence referred to as tilt correction system.

In FIG. 2, reference symbol 11 denotes an anti-dust glass panel. The anti-dust glass panel 11 is arranged between the cylindrical mirror 10 and the surface 12 of the photosensitive drum to prevent fine particles of toner and paper floating in air near the surface 12 of the photosensitive drum from colliding with and adhering to the optical elements (on the rotary polygon mirror side).

In this embodiment, the surface (plane) of the anti-dust glass panel 11 is coated with an anti-reflection film that is formed by evaporation. The anti-reflection film is made to have a film thickness adapted to maximize its light transmittance for the angle of incidence of the most off-axis ray of the light beam deflected by the optical deflector and striking the surface of the anti-dust glass panel 11.

In this embodiment, the light beam emitted from the light source (semiconductor laser) 1 is substantially collimated by the collimator lens 2. Then, the light beam is transformed into a divergent light beam by the spherical lens 3 and made to enter the cylindrical lens 5 by way of the first fold mirror 4. The divergent light beam entering the cylindrical lens 5 is then converged in the sub-scanning section and, after being reflected by the second fold mirror 6, transmitted through the fθ lens system 8 to strike the deflection surface (reflection surface) 7a of the optical deflector 7 and become focussed to form a substantially linear image (extending in the main-scanning direction) at a position near the deflection surface 7a. The light beam led to the deflection surface 7a strikes the latter with a predetermined angle relative to a plane perpendicular to the axis of rotation of the optical deflector 7 (the plane in which the optical deflector rotates). In other words, the light beam coming from the optical system 41 for incident light strikes the deflection surface 7a of the optical deflector 7 aslant in the sub-scanning section.

To be more accurate, the light beam coming from the optical system 41 for incident light strikes the deflection surface 7a of the optical deflector 7 with an angle of incidence not equal to right angles relative to the deflection surface 7a in the sub-scanning section. Note that the sub-scanning section contains the axis of rotation of the optical deflector 7 and the optical axis of the fθ lens system 8.

On the other hand, the light beam transmitted through the cylindrical lens 5 is then reflected by the second fold mirror 6 and transmitted through the fθ lens system 8 without being modified, i.e. in a divergent state, in the main-scanning section before it is made to strike the deflection surface 7a of the optical deflector 7 substantially along the center line of the deflection angle of the optical deflector 26 (front incidence). The divergent light beam striking the deflection surface 7a of the optical deflector 7 is made to show a width greater than the facet width of the deflection surface 7a of the optical deflector 7 in the main-scanning direction by the collimator lens 2 and the spherical lens 3. In other words, the light beam striking the deflection surface has a width in the main-scanning direction greater than that of the deflection surface in the main-scanning direction. Thus, this embodiment uses a so-called overfilled optical system.

Then, the light beam reflected/reflected by the deflection surface 7a of the optical deflector 7 is led the surface 12 of the photosensitive drum (surface to be scanned) by way of the fθ lens system 8, the third fold mirror 9 and the cylindrical mirror 10 and focussed to produce a spot of light on the surface 12. Thus, as the optical deflector 7 is driven to rotate in the sense of arrow A, the spot of light scans the surface 12 of the photosensitive drum (surface to be scanned) in the sense of arrow B (main-scanning direction). As a result, an image is recorded on the surface 12 of the photosensitive drum (surface to be scanned) that operates as recording medium.

In this embodiment, the on-axis ray of the light beam enters each of the transmission type optical elements of the device perpendicularly relative to the surface thereof. In other words, the angle of incidence of the on-axis ray of the light beam approximately equal to zero, or $\phi \sim 0°$. The angle $\phi$ is not exactly equal to zero because it shows a predetermined angle relative to the optical axis of the focussing optical system in the sub-scanning direction as pointed out above. On the other hand, while the angle of incidence of the off-axis ray of the light beam varies as a function of the radius of curvature of the transmission surface of the transmission type optical element, the angle of incidence of the part located outermost from the optical axis is assumed to be as $\phi = 20°$ for the purpose of convenience of explanation.

Figure 3:
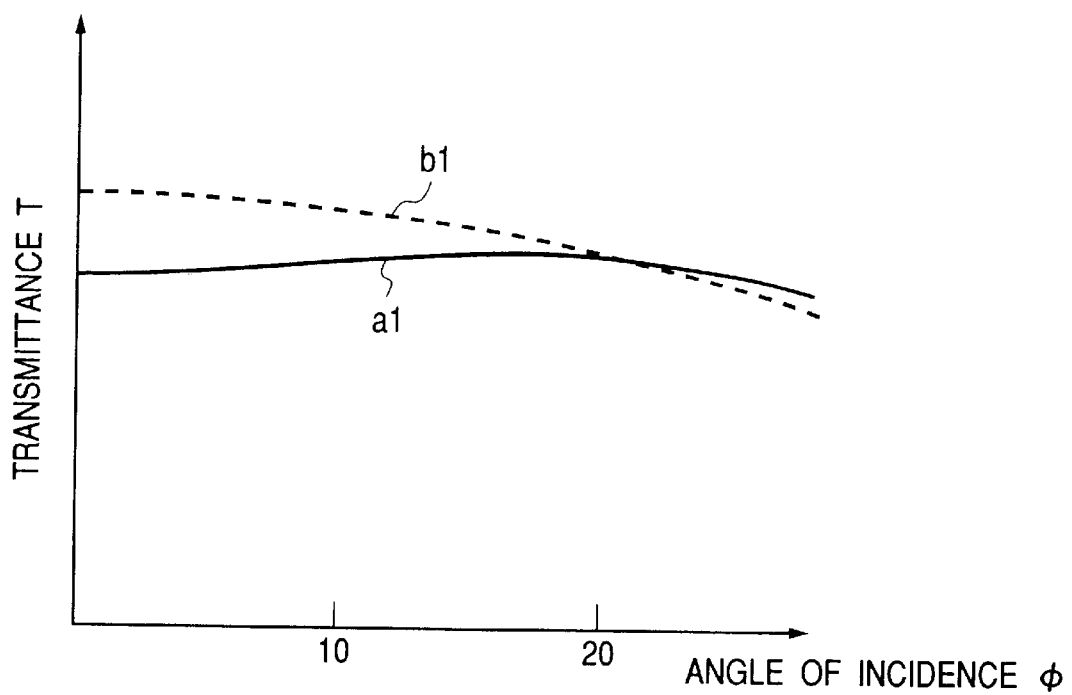
FIG. 3 is a graph illustrating the dependency of the transmittance of an anti-reflection film that can be used for the purpose of the present invention on the angle of incidence.

In this embodiment, the surface of the anti-dust glass panel 11 is coated with an anti-reflection film that is formed by evaporation as pointed out above. FIG. 3 is a graph illustrating the dependency of the transmittance of an anti-reflection film that can be used for the purpose of the present invention on the angle of incidence.

Referring to FIG. 3, the horizontal axis of the graph indicates the angle of incidence $\phi$ while the vertical axis of the graph indicates the transmittance T. In FIG. 3, the solid line a1 shows the dependency of the transmittance of the anti-reflection film on the angle of incidence of this embodiment. If the angle of incidence of the most off-axis ray of the light beam entering any of the transmission type optical elements is 20°, the anti-reflection film is made to show a film thickness that maximizes the transmittance for the angle of incidence equal to 20°. The broken line b1 in FIG. 3 shows the dependency of the transmittance of the anti-reflection film on the angle of incidence of a prior art device, where the film thickness of the anti-reflection film is made to show a film thickness that maximizes the transmittance for the on-axis ray (showing an angle of incidence equal to 0°) of the light beam.

As seen from FIG. 3, the transmittance of the anti-reflection film of this embodiment having the above defined film thickness as indicated by solid line al is less dependent on the angle of incidence than that of the anti-reflection film of the prior art device indicated by broken line b1. Thus, the problem specific to the overfilled type scanning optical device that the quantity of light getting to a unit area of the surface to be scanned (surface of the photosensitive drum) is greater on axis than off axis in the main-scanning direction to produce an uneven distribution of quantity of light is aggravated when the prior art anti-reflection film is used, whereas, on the other hand, the problem is alleviated when an anti-reflection film according to the invention as defined above is used.

This effect can be exploited efficiently by making the anti-reflection film to have a film thickness adapted to maximize its light transmittance for the angle of incidence of the most off-axis ray of the light beam deflected by the optical deflector forming the outer edges of the image.

The above identified effect depends also on the radius of curvature of the optical element. Therefore, it is desirable to arrange an anti-reflection film according to the invention on the transmission surface of an optical element that shows a large difference between the on-axis ray of the light beam and the most off-axis ray of the light beam. For instance, the surface (plane) of the anti-dust glass panel 11 shows a difference between the angle of incidence of the on-axis ray of light beam and that of the most off-axis ray of light beam greater than the concave surface of the fθ lens system 8 located closest to the optical deflector 7. Thus, for the purpose of the present invention, it is preferable to form an anti-reflection film according to the invention by evaporation on the planar surface of the optical element (anti-dust glass panel) adapted to transmit light.

An anti-reflection film to be used for the invention may preferably be formed not only on the surface of the anti-dust glass panel but also on the transmission surfaces of a plurality (or all) of transmission type optical elements used in the scanning optical system, because the quality of the image produced by a scanning optical device comprising an overfilled optical system can be improved by minimizing the uneven distribution of quantity of light since the overfilled type optical system is designed to minimize the size of the spot of focussed light in order to make the system a high definition system.

It is also possible to utilize the angle dependency of the reflection performance of the reflection film formed on the reflection members including the planar mirror and the cylindrical mirror in order to eliminate the uneven distribution of quantity of light in the main-scanning direction. If such is the case, the reflectance of the reflection members is made to be higher for an off-axis ray of light beam than an on-axis ray of light beam.

However, the performance of the reflection film is more dependent on the polarized state of the light beam striking it than the anti-reflection film. More specifically, the difference between P-polarized light and S-polarized light is enormous in terms of the dependency of the reflectance on the angle of incidence to make the use of such a reflection film cumbersome. Further, the dependency on the wavelength is generally greater in case of a reflection film than in case of an anti-reflection film. The wavelength of the laser beam emitted from a semiconductor laser is not invariable because of the structure thereof and can vary as the intensity of the emitted light and the ambient temperature change. On the other hand, it is difficult to achieve the object of the present invention if the film is hypersensitive to the wavelength in terms of performance. Based on these considerations, the inventor of the present invention believes that a uniform distribution of quantity of light can be realized in the main-scanning direction most effectively by using an anti-reflection film. Thus, the object of the present invention can be achieved by using an anti-reflection film on the transmission surface of one or more than one of the optical elements even if a reflection film is also employed to realize a uniform distribution of quantity of light.

Meanwhile, the light beam coming from the optical system for incident light is made to strike the deflection surface of the optical deflector substantially along the center line of the deflection angle of the optical deflector. In other words, the scanning optical system is that of so-called front incidence. With such a scanning optical system, the change in the quantity of deflected light due to the rotary motion of the optical deflector is symmetrical relative to the optical axis of the focussing optical system. Therefore, if an anti-reflection film according to the invention is formed on an optical element with a uniform film thickness, its effect can be made symmetrical relative to the optical axis of the focussing optical system. Such a film can be formed with ease and provide a satisfactory effect for alleviating the problem of uneven distribution of quantity of light.

Note that while FIG. 2 schematically shows the configuration of an image forming apparatus comprising the above described embodiment of scanning optical device (overfilled type optical system), the above embodiment can suitably be used in any other appropriate image forming apparatus.

[Embodiment 2]

Figure 4:
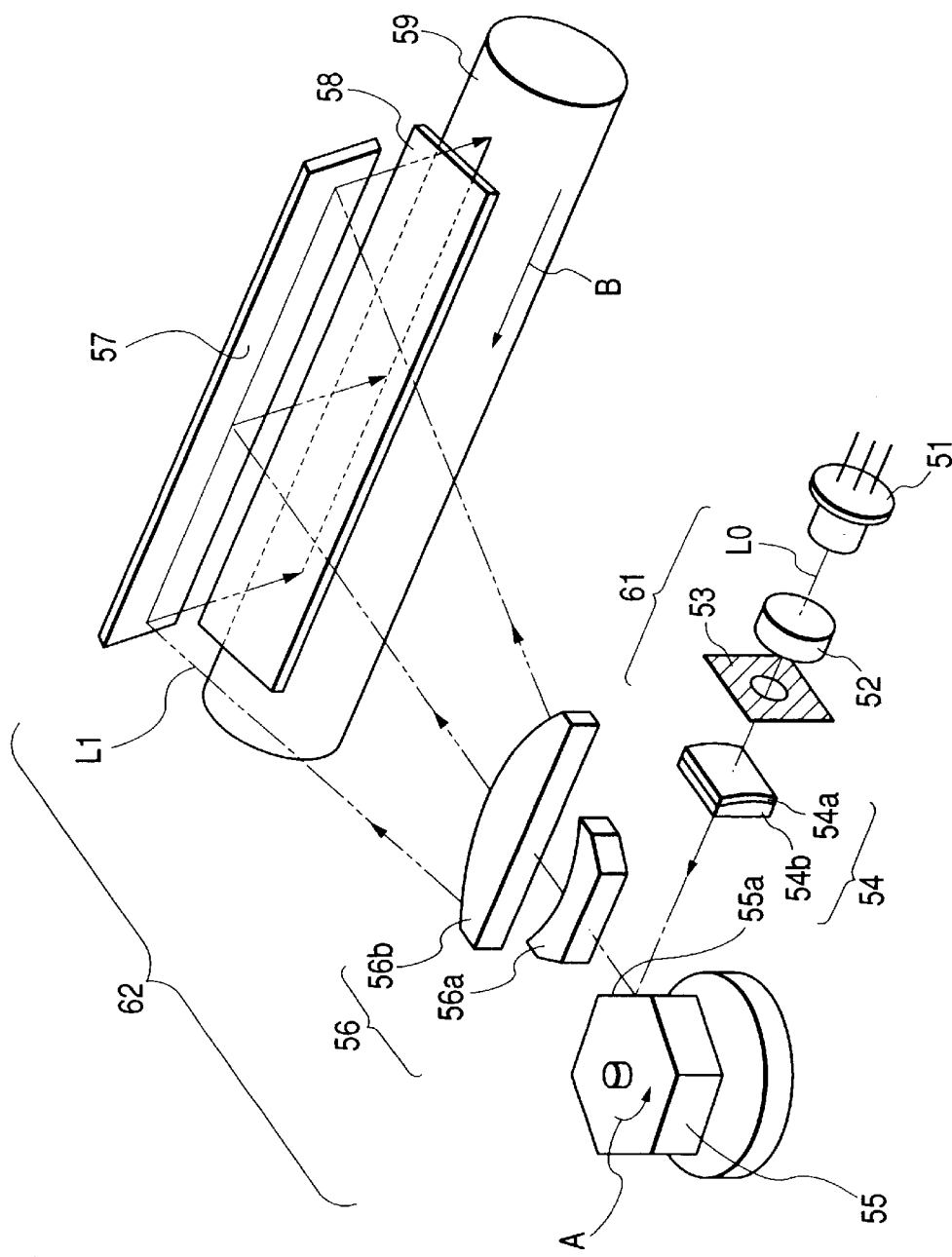
FIG. 4 is a schematic perspective view of a principal portion of Embodiment 2 of scanning optical device according to the invention and used in an image forming apparatus.

FIG. 4 is a schematic perspective view of a principal portion of Embodiment 2 of scanning optical device according to the invention and used in an image forming apparatus, which may be a laser beam printer or a digital copying machine as pointed out above by referring to the first embodiment.

Referring to FIG. 4, the light beam L0 emitted from light source 51 is substantially collimated by collimator lens 52 and limited for its quantity of light by aperture 53 before entering cylindrical lens system 54 having a pair of cylindrical lenses 54a and 54b. The cylindrical lens system 54 emits the substantially collimated light beam that enters it without modifying it in the main-scanning section but converges the light beam in the sub-scanning section to produce a substantially linear image (extending in the main-scanning direction) on the deflection surface (reflection surface) 55a of optical deflector (rotary polygon mirror) 55. The collimator lens 52, the aperture 53 and the elements of the cylindrical lens system 54 form an optical system for incident light 61, which is also referred to as first optical system. The first optical system makes the light beam strike the deflection surface 55a in such a way that the light beam shows a width in the main-scanning direction greater than the width of the deflection surface 55a in the main-scanning direction.

The light beam deflected/reflected by the deflection surface 55a of the optical deflector 55 is then led to the surface to be scanned 59 of a photosensitive drum by way of an fθ lens system 56 including a spherical lens 56a and a toric lens 56b, a fold mirror 57 and an anti-dust glass panel 58 to produce a spot of light as it is focussed by the fθ lens system 56. The spot of light is made to scan the surface 59 of the photosensitive drum (surface to be scanned) in the main-scanning direction as the optical deflector 55 is driven to rotate in the sense of arrow A in FIG. 4. As a result, an image is recorded on the surface 59 of the photosensitive drum (surface to be scanned) that operates as recording medium. The fθ lens system 56, the fold mirror 57 and the anti-dust glass panel 58 form a second optical system, or a focussing optical system 62. In this embodiment, as in Embodiment 1, the surface of the anti-dust glass panel 58 is coated with an anti-reflection film that is formed by evaporation. The anti-reflection film is made to have a film thickness adapted to maximize its light transmittance for the angle of incidence of the most off-axis ray L1 of the light beam deflected by the optical deflector and striking the surface of the anti-dust glass panel. With this arrangement, the surface 59 of the photosensitive drum (surface to be scanned) shows a substantially uniform distribution of quantity of light.

Figure 5:
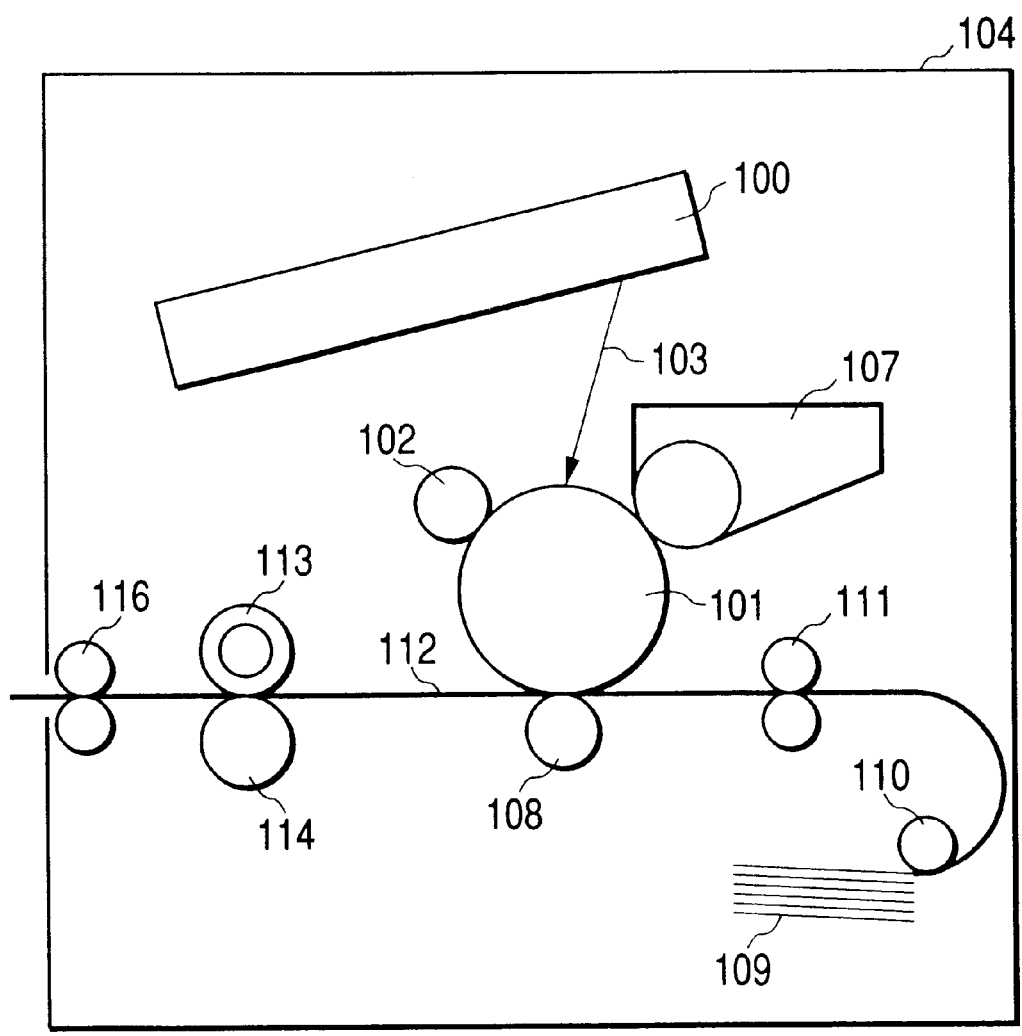
FIG. 5 is a schematic cross sectional view of an image forming apparatus comprising a scanning optical device according to the invention taken along the sub-scanning direction.

FIG. 5 is a schematic cross sectional view of an image forming apparatus comprising a scanning optical device according to the invention taken along the sub-scanning direction. In FIG. 5, reference numeral 104 denotes the image forming apparatus. Reference numeral 100 denotes either Embodiment 1 or Embodiment 2 of multi-beam scanning optical system according to the invention. Reference numeral 101 denotes a photosensitive drum operating as an electrostatic latent image carrier. A charging roller 102 adapted to charge the surface of the photosensitive drum 101 uniformly with electricity is arranged above and held in contact with the photosensitive drum 101. The electrically charged area of the surface of the photosensitive drum 101 located downstream relative to the contact line of the charging roller 102 and the drum 101 is scanned by the light beam 103 emitted from the scanning optical system 100.

The light beam 103 is modulated according to the image data applied to the optical scanner so that an electrostatic latent image is formed on the surface of the photosensitive drum 101 as the latter is irradiated with the light beam 103. The electrostatic latent image is then developed into a toner image by means of a developing device 107 arranged downstream relative to the area of the photosensitive drum 101 irradiated with the light beam 103 in the sense of rotation of the drum 101 and also held in contact with the photosensitive drum 101. The toner image is then transferred onto a sheet of paper 112 by a transfer roller 108 arranged vis-a-vis the photosensitive drum 101 at a position below the latter. The sheet of paper 112 is fed from a sheet cassette 109 arranged in front of the photosensitive drum 101 (right to the drum 101 in FIG. 5), although it may alternatively be fed with hand. A feed roller 110 is arranged at an end of the sheet cassette 109 and adapted to feed a sheet of paper at a time from the cassette 109 to the transfer route by way of a register roller 111.

Then, the sheet 112 now carrying the unfixed toner image is moved to a fixing device located behind the photosensitive drum 101 (left to the drum 101 in FIG. 5). The fixing device comprises a fixing roller 113 provided in the inside with fixing heater (not shown) and a press roller 114 for pressing the fixing roller 113 so that the toner image on the sheet 112 moved from the transfer section is fixed as the sheet is pressed and heated between the fixing roller 113 and the press roller 114. A pair of delivery rollers 116 are arranged behind the fixing roller 113 to deliver the sheet 112 now carrying a fixed image to the outside of the image forming apparatus.

The present invention can find various applications besides the above described embodiments. The present invention covers any such applications without departing from the scope of the invention specifically defined by the appended claims.

What is claimed is:

1. A scanning optical device comprising:

a light source;

an optical deflector having a deflection surface adapted to deflect the light beam emitted from said light source in the main-scanning direction;

a first optical system for leading the light beam emitted from said light source to said optical deflector, said first optical system being adapted to make the light beam strike the deflection surface of the optical deflector with a width greater than that of the deflection surface in the main-scanning direction; and a second optical system for focussing the light beam deflected by said optical deflector onto a surface to be scanned;

said second optical system having an optical element provided on at least an optical surface thereof with an anti-reflection film having a film thickness so adapted as to maximize its light transmittance for the angle of incidence of the most off-axis ray of the light beam deflected by the optical deflector and striking said optical surface.

2. A scanning optical device according to claim 1, wherein said second optical system further includes at least a reflector mirror arranged on the optical path between said optical deflector and the surface to be scanned, said reflector mirror being adapted to show a reflectance higher for the most off-axis ray of the light beam deflected by the optical deflector than for the on-axis ray of the light beam.

3. A scanning optical device according to claim 1, wherein said second optical system includes an fθ lens system for focussing the light beam deflected by the optical deflector on the surface to be scanned and a flat glass panel arranged on the optical path between the fθ lens system and the surface to be scanned, said anti-reflection film being formed on a surface of said flat glass panel.

4. A scanning optical device according to claim 3, wherein said second optical system further includes at least a reflector mirror arranged on the optical path between said fθ lens system and said flat glass panel, said reflector mirror being adapted to show a reflectance higher for the most off-axis ray of the light beam deflected by the optical deflector than for the on-axis ray of the light beam.

5. A scanning optical device according to claim 4, wherein said at least a refractor mirror includes a plane mirror and a cylindrical mirror.

6. A scanning optical device according to claim 3, wherein said fθ lens system includes a spherical lens and a toric lens.

7. A scanning optical device according to claim 1, wherein said first optical system is adapted to make the light beam emitted from said light source strike the deflection surface of the optical deflector as a linear image extending in the main-scanning direction.

8. A scanning optical device according to claim 7, wherein said first optical system includes a collimator lens for transforming the light beam emitted from said light source into a collimated light beam, a spherical lens having negative power for transforming the collimated light beam into a divergent light beam and a cylindrical lens having refractive power only in the sub-scanning direction to make the divergent light beam strike the deflection surface of the optical deflector as a linear image extending in the main-scanning direction.

9. A scanning optical device according to claim 1, wherein the light beam emitted from said light source strikes the deflection surface of said optical deflector with a predetermined angle not equal to right angles in the sub-scanning section.

10. A scanning optical device according to claim 9, wherein the light beam emitted from said light source strikes the deflection surface of said optical deflector substantially along the center line of the deflection angle of the optical deflector.

11. A scanning optical device according to claim 1, wherein said optical deflector comprises a polygon mirror.

12. A scanning optical device according to claim 1, wherein said light source comprises a semiconductor laser.

13. An image forming apparatus comprising:

a scanning optical device according to any of claims 1 to 12;

a photosensitive member arranged at the surface to be scanned;

a developing unit for developing an electrostatic latent image formed on a surface of said photosensitive member by the light beam made to scan the surface by means of said scanning optical device into a toner image;

a transfer unit for transferring the developed toner image onto a toner image receiving member; and a fixing unit for fixing the transferred toner image on the toner image receiving member.

* * * * *

UNITED STATES PATENT AND TRADEMARK OFFICE
CERTIFICATE OF CORRECTION

PATENT NO. : 6,288,734 B1
DATED : September 11, 2001
INVENTOR(S) : Kazuhiko Matsuoka It is certified that error appears in the above-identified patent and that said Letters Patent is hereby corrected as shown below:

<u>Column 5,</u>
Line 24, "reflected/reflected" should read -- deflected/reflected --.

<u>Column 9,</u>
Line 49, "refractor" should read -- reflector --.

Signed and Sealed this

Eighteenth Day of June, 2002

*Attest:*

*Attesting Officer*

JAMES E. ROGAN
*Director of the United States Patent and Trademark Office*